United States Patent
Kringel

Patent Number: 6,109,599
Date of Patent: *Aug. 29, 2000

[54] FLEXIBLE CONNECTOR

[76] Inventor: George N. Kringel, 21 Burnham Hill, Westport, Conn. 06880

[*] Notice: This patent issued on a continued prosecution application filed under 37 CFR 1.53(d), and is subject to the twenty year patent term provisions of 35 U.S.C. 154(a)(2).

[21] Appl. No.: 08/567,040

[22] Filed: Dec. 4, 1995

Related U.S. Application Data

[63] Continuation-in-part of application No. 08/293,438, Aug. 19, 1994, Pat. No. 5,472,289, which is a continuation of application No. 07/949,991, Sep. 24, 1992, Pat. No. 5,344,250, which is a division of application No. 07/704,835, May 20, 1991, Pat. No. 5,289,652, which is a continuation of application No. 07/311,743, Feb. 17, 1989, abandoned.

[51] Int. Cl.[7] ........................................................ F16F 1/06
[52] U.S. Cl. ............................. 267/179; 267/33; 267/73; 267/170
[58] Field of Search .................................... 267/179, 170, 267/178, 287, 33, 73

[56] References Cited

U.S. PATENT DOCUMENTS

| | | |
|---|---|---|
| 1,599,066 | 7/1926 | Rushmore . |
| 1,610,770 | 12/1926 | Greene . |
| 1,855,253 | 4/1932 | Moore et al. .............................. 267/33 |
| 1,936,389 | 11/1933 | Hallquist .................................. 267/33 |
| 1,939,968 | 12/1933 | Frei . |
| 2,181,954 | 12/1939 | Wallat . |
| 2,368,775 | 2/1945 | Perret . |
| 2,871,016 | 1/1959 | Rapaport .................................. 267/33 |
| 3,158,392 | 11/1964 | Shell . |
| 3,618,214 | 11/1971 | Armstrong .................................. 32/14 |
| 4,584,898 | 4/1986 | Panushka . |
| 4,854,556 | 8/1989 | Pietrzak . |
| 5,160,122 | 11/1992 | Balsells . |
| 5,207,349 | 5/1993 | Kringel . |
| 5,237,767 | 8/1993 | Kringel et al. . |
| 5,289,652 | 3/1994 | Kringel et al. . |
| 5,344,250 | 9/1994 | Kringel et al. . |

Primary Examiner—Matthew C. Graham

[57] ABSTRACT

A flexible connector which is a combination of a coil spring and an elastomeric sleeve is disclosed. This combination allows for greater strength and resistance to exceeding the strain limit of the coil spring.

13 Claims, 4 Drawing Sheets

FLEXIBLE CONNECTOR

RELATED U.S. APPLICATIONS

This application is a continuation-in-part of application Ser. No. 08/293,438, filed Aug. 19, 1994 now U.S. Pat. No. 5,472,289, which is a continuation of Ser. No. 07/949,991, filed on Sep. 24, 1992, now U.S. Pat. No. 5,334,250, which is a divisional of Ser. No. 07/704,835 filed May 20, 1991, now Pat. No. 5,289,652, which is a continuation of application Ser. No. 07/311,743 filed Feb. 17, 1989, now abandoned.

BACKGROUND OF THE INVENTION

This invention is directed to the field of elastic connectors. The elastic connectors may be used in mounting devices that are capable of displaying advertising and promotional materials in a conspicuous fashion so that they extend out into the aisle. The elastic connectors are capable of use in multiple orientations. Some mounting devices that have been used prior to the present invention clamp onto the upper and lower surfaces of the shelf adjacent the edge and frequently have multiple mechanical parts, may be bulky, and may have elements or parts that extend away from the body of the mounting device. Many mounting devices have elements or parts that extend away from the body of the mounting device, such as clamps or brackets. Such elements or parts tend to detract from the overall appearance of the mounting device and may obstruct use of the adjoining shelf space or access to products displayed on the shelf. Moreover, the customer may bump into these parts or elements or snag clothing or jewelry on them.

Certain connectors known prior to the present invention are unable to withstand rough usage to which a mounting device may be subject in a grocery or other retail store. During use, the mounting device and connector may be repeatedly bumped and manipulated. Unless the mounting device, and in particular the connector, is resilient and durable, it may not be able to withstand even accidental abuse and remain in place on the shelf for the full duration of the promotional program.

The mounting devices mounted on the distal edges of grocery or other retail store shelves are readily accessible and are frequently subject to vandalism or intentional abuse. It is not uncommon for children, or others, to pull on the advertising display or to hang from it, thereby, placing substantial force on the connector. In addition, persons having access to the display may mutilate it or its mounting. Many of the connectors in the mounting devices that have been used prior to the present invention cannot withstand such abuse. It is often necessary to connect certain objects to each other with a non-rigid connecting means. It is necessary to join them but allow for some change in their separation or a certain amount of angular displacement. It is therefor necessary to use some form of resilient connector. In addition, in certain mounting applications, objects are likely to be jostled, resulting in potential to dislodge them from their moorings. A flexible connector would serve to absorb the forces exerted on one object and allow the connection to remain solid.

The problem has always been that any resilient connector (spring) will necessarily have a strain limit (and often a low one) and may fail unexpectedly. Traditionally the only way to increase the strain limit of a spring or spring-type device was to prohibitively increase either its bulk or its cost, or both. Another disadvantage of conventional connecting means is that any structural enhancements often come at the sacrifice of angular displacement. Typically, in configurations where a spring is embedded in a sheath, the allowable bend radius is severely limited.

Prior art devices used in this regard have not been able to provide an adequate solution.

U.S. Pat. No. 1,599,066 to Rushmore, for FLEXIBLE POST is directed to a sign-post which is designed to withstand collisions with automobiles. The post is constructed of a resilient material, preferably rubber, with a helical or other spirally coiled wire spring imbedded therein. The post is designed to tear loose from its base, prior to elastic failure. Elongation is not specifically desired or taught.

U.S. Pat. No. 1,610,770 to Greene, for SPRING is directed to a spring with a dampening device placed therein. The invention places a sponge rubber insert into a coil spring and then vulcanizes the rubber. The rubber insert then conforms to the inner diameter of the coil spring such that there are present spiral channels in the rubber core in which lie the spring coils.

U.S. Pat. No. 1,939,968 to Frei, for FLEXIBLE POST is directed to a sign-post similar to that of Rushmore. The post is comprised of a tubular casing of rubber with a coil spring concentrically disposed therein. The coil spring has its outer periphery engaged with the inner wall of the tubular casing. Within the coil spring, is seated a polygonal plug which is anchored such that rotation of the post is precluded.

U.S. Pat. No. 2,181,954 to Wallat, for SPRING is directed to a spring assembly. It is necessarily comprised of two separate coil springs disposed concentrically with a solid tubular member placed between them.

U.S. Pat. No. 3,618,214 to Armstrong, for COILED WIRE SPRING APPLIANCES FOR USE IN ORTHODONTICS is directed to a device to be used in conjunction with braces to provide corrective forces to teeth. Its main object is to replace the rubber bands commonly associated with braces. It is comprised of one or more coil springs disposed within a semi rigid sheath. The sheath is designed protect the coil springs from radial forces and food. It is designed to allow for inner spring elongation without any elongation of the sheath. They are not mechanically connected to yield the synergistic properties yielded by applicant's invention.

U.S. Pat. No. 4,854,556 to Pietrzak, for DEVICE FOR DAMPING SHOCKS AND VIBRATIONS is directed to a device for preventing the transmission of vibrations. It is comprised of a coil spring which is embedded within an elastomeric material.

U.S. Pat. No. 5,160,122 to Balsells, for COIL SPRING WITH AN ELASTOMER HAVING A HOLLOW CROSS SECTION is directed to compression springs which exhibit certain load deflection characteristics. The device is comprised of a plurality of coil means with an elastic means disposed around and between the coil means.

OBJECTS OF THE INVENTION

It is an object of the invention to provide a flexible connector.

It is also an object of the invention to provide a device for securing two or more objects together while allowing for some movement between them.

It is another object of the invention to provide a method for increasing the load bearing capability of a spring without significantly increasing its weight or cost.

It is a further object of the invention to provide a device which limits the extension of a spring while increasing its load bearing ability.

It is another object of the invention to provide a flexible connector which is significantly resistant to failure, even under heavy load.

These and other objects of the invention are set forth in the description which follows or may be learned by practice of the invention.

SUMMARY OF THE INVENTION

The present invention overcomes the disadvantages of the prior art and attains the objects of the invention by providing a unique flexible connector which is comprised of two resilient materials, and an anchoring means. This device may be used in any situation where two objects are to be connected where a totally rigid connector (bolt, screw, nail, etc) is inappropriate. The invention provides for a resilient connector which acts as a spring to allow for separation between the objects.

To achieve the objects, and in accordance with the purposes of the invention, as embodied and broadly described herein, the invention is a flexible connector comprised of an inner resilient member which is disposed within an outer resilient member. The connector is anchored to objects or a mounting device. The inner member and the outer member interact in such a manner as to both increase the load that the device may handle without failure and act as an extension limiter to prevent stretching either member beyond its elastic limit.

The concept of the invention relates broadly to the configuration of two resilient materials working in cooperation to achieve certain synergies. The description will henceforth refer to the preferred embodiment in which the inner member is a coil spring and the outer member is an elastomeric sleeve. It should be noted that this is for illustrative purposes and the invention is in no way limited thereto.

DETAILED DESCRIPTION OF THE PREFERRED EMBODIMENT

Reference will now be made in detail to a present preferred embodiment of the invention, an example of which is illustrated in the accompanying drawings.

Figure 1:
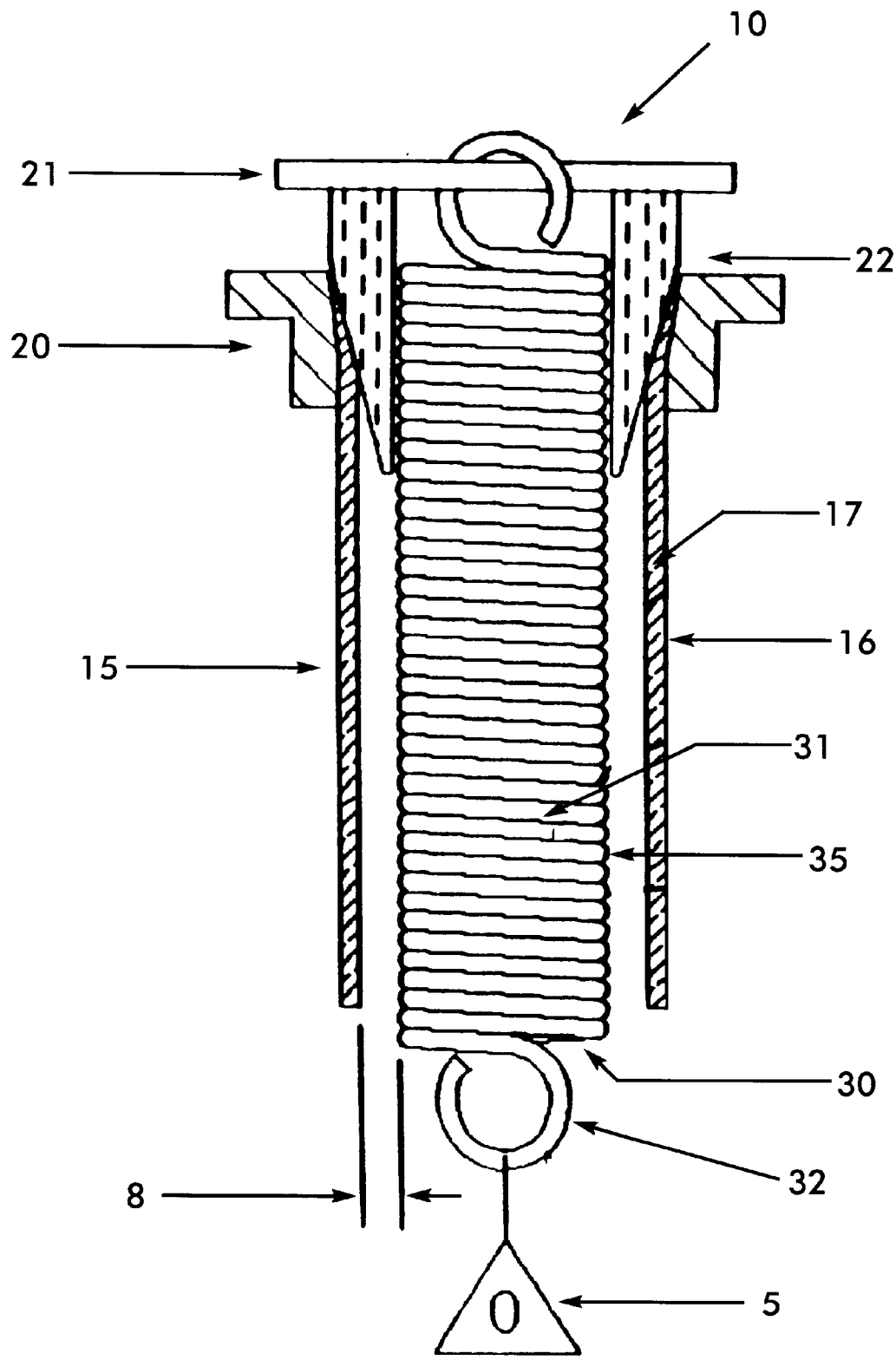
FIG. 1 is an illustration of the Flexible Connector in a zero load state.
Figure 4:
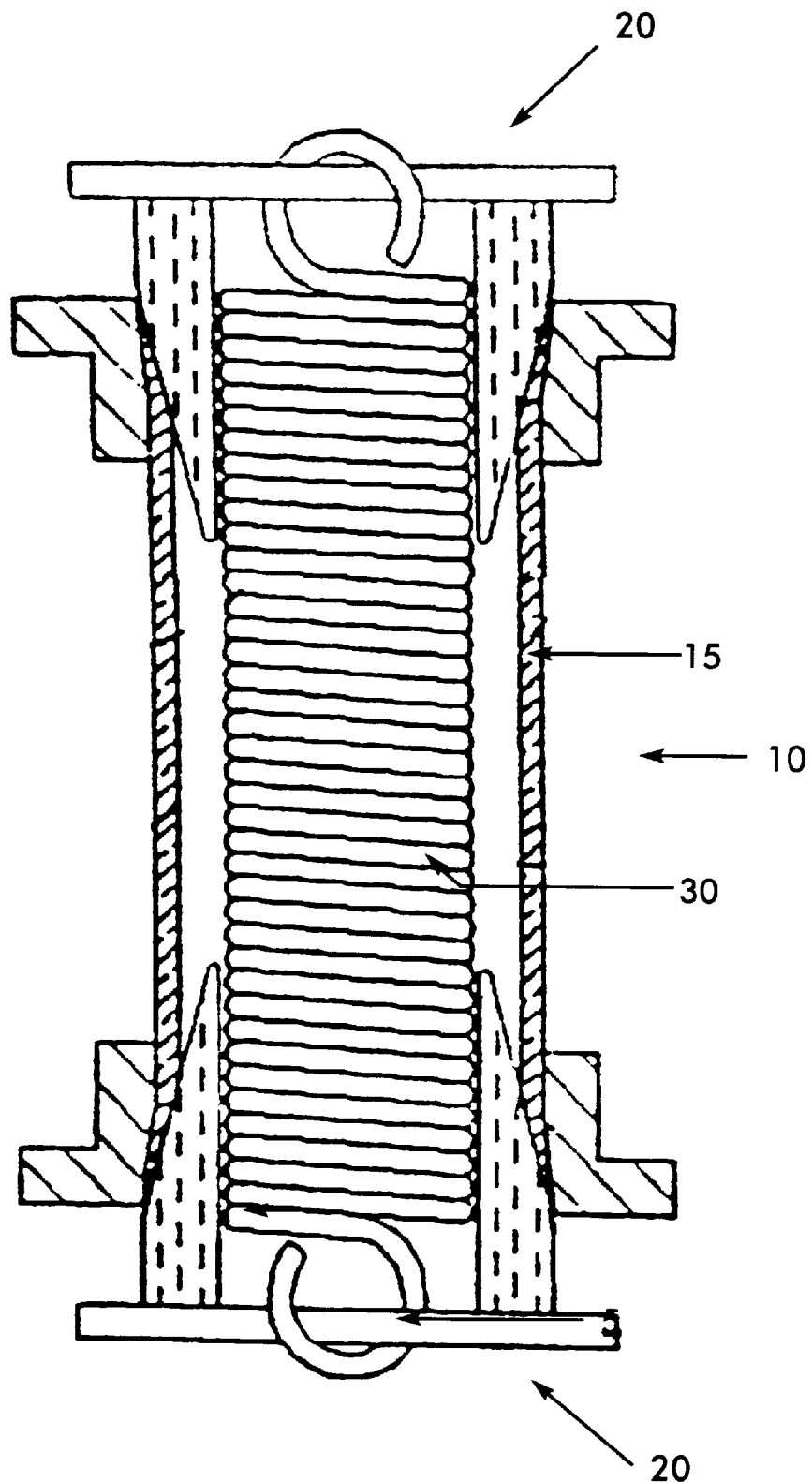
FIG. 4 is an another illustration of the Flexible Connector according to the present invention.

Referring now to FIG. 1 there is shown the flexible connector. The connector is secured at one end by an anchor 20. This anchor is suitable for securing the flexible connector to an object. In this embodiment the anchor 20 is comprised of a pin 21 and a wedge 22. Typically there is an anchor or similar assembly at each end of the flexible as shown in FIG. 4.

Connected to the anchor is a coil spring 30. This spring is generally an industry standard normal extension spring. It can be made of steel, brass or any other suitable material. Its spring rate, and other mechanical characteristics will be determined by the material used, the diameter of the wire, and the pitch of the windings, among other things. In the illustrated embodiment, coils 31 are shown to terminate in loops 32 for connection to the anchor assembly. It should be understood that various other terminations may be used depending on the chosen anchor geometry.

Also connected to the anchor assembly is a sleeve 15. This sleeve is tubular in shape and is defined by an inner diameter 17 and an outer diameter 16. The sleeve may be fabricated from an elastomeric material such as polyurethane, rubber, latex or the like. Its mechanical properties will also be determined by material, wall thickness, and other considerations.

There is necessarily a control gap 8 which exists between the inner diameter 17 of the sleeve 15 and the outer diameter 35 of the spring 30 when the connector is in the zero load position.

Figure 2:
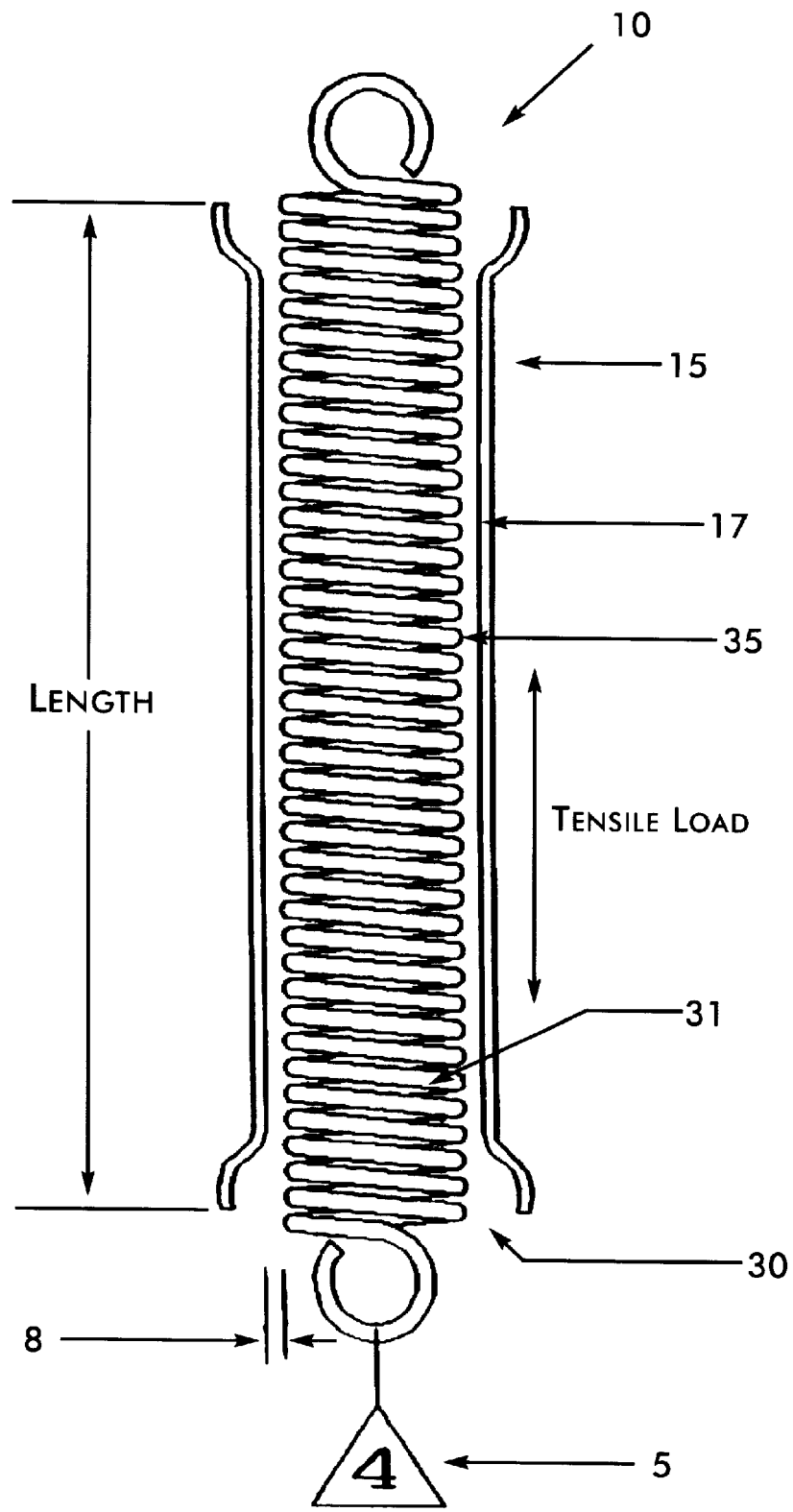
FIG. 2 is an illustration of the Flexible Connector partially elongated in a loaded state.

FIG. 2 illustrates what happens when a tensile load 5 is exerted on the connector. As the load is applied, the connector elongates. As this happens, both the outer diameter 35 of the spring 30 and the inner diameter 17 of the sleeve 15 decrease. During this initial length expansion the spring and sleeve are contributing one unit each of load opposing force. Their load opposing forces are additive.

The geo-mechanical properties of the sleeve differ from those of the spring insofar that the mean diameter of the sleeve will decrease at a greater rate than that of the spring. This being the case, the inner diameter 17 of the sleeve will approach the same value as the outer diameter 35 of the spring. This will result in a corresponding decrease in the width of the control gap 8.

Figure 3:
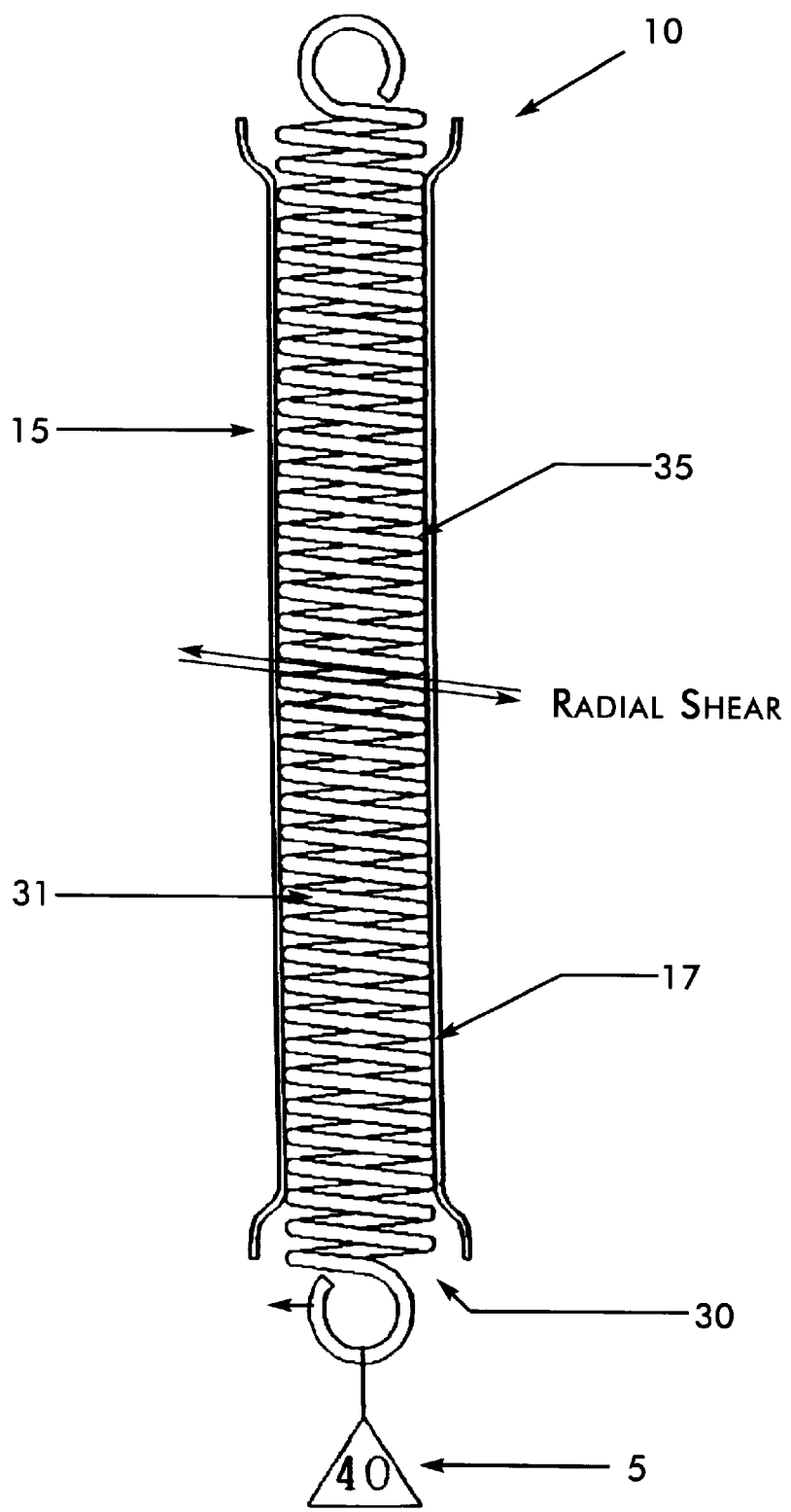
FIG. 3 is an illustration of the Flexible Connector in its fully elongated state.

FIG. 3 shows the flexible connector with the control gap at zero. At this point the assembly begins to function in a different manner. The load opposing forces are no longer additive. Typically, the load bearing ability of the connector now increases by an order of magnitude—or more. There is a step change in the load and extension curve. This means that increasing load will result in substantially no corresponding increase in overall length, a unique feature of the invention. The beneficial result being that neither the spring 30 nor the sleeve 15 will exceed there individual elastic limits. Elastic limit is defined as the farthest point the spring may be stretched and still return to its original length.

The phenomenon of extension limiting occurs when the inside diameter of the sleeve decreases to the point where it contacts the outside diameter of the spring. At that point the control gap 8 is zero. Prior to that point the load carried by the elastomeric sleeve is primarily a function of its cross sectional area:

$$\text{Load Carrying Ability} = (\pi R_o^2 - \pi R_1^2)T$$

Where $R_o$ = Outside Radius of Sleeve $R_I$ = Inside Radius of Sleeve $T$ = Tensile strength of sleeve material (in units force/area)

Once sleeve-to-spring contact is made, the further reduction in the inside diameter of the sleeve is prevented. At this point the stress within the elastomeric material is rapidly converted to shear lines which spiral along the axis of the spring (FIG. 3). Even though the wall thickness of the sleeve decreases under increasing load, the effective cross sectional increases rapidly as the stress aligns itself with the very long spiral wrap of the coil spring.

The result is a rugged connector which is capable of withstanding high loads, which in the absence of the synergistic combination of the invention would damage the spring.

Another failure of prior art springs is their inability to function well in any direction other than along their principal axes. The inventive flexible connector does not suffer a loss of strength when bent about its axis. It functions even with an extremely sharp bend radius any where along its working length.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims. Furthermore, the invention is not limited for use only in connection with mounting devices for advertising and promotional materials. Various uses and applications for the above-described flexible connector are contemplated.

I claim:

1. A flexible connector for resiliently securing at least two objects together, the flexible connector comprising:

first resilient means for resiliently connecting the at least two objects, wherein said first resilient means undergoes partial elastic elongation upon application of a force, wherein said first resilient means includes a flexible sleeve;

second resilient means for resiliently connecting the at least two objects, wherein said second resilient means undergoes partial elastic elongation upon application of the force, wherein said second resilient means includes a spring assembly;

first anchoring means for securing the flexible connector to one of the at least two objects, said first and second resilient means being secured to said first anchoring means; and second anchoring means for securing the flexible connector to one of the at least two objects, said first and second resilient means being secured to said second anchoring means;

wherein said first and second resilient means undergo partial simultaneous elastic elongation with differing reduction rates upon application of the force and contribute opposing forces to the force until said first resilient means contacts said second resilient means, whereupon said first and second resilient means are capable of withstanding additional forces at a substantially reduced elongation rate;

wherein said second resilient means is inhibited from elongating greater than its elastic limit by the forces exerted on said second resilient means by said first resilient means when said flexible sleeve contacts said spring assembly, and wherein said first resilient means is inhibited from elongating greater than its elastic limit by the forces exerted on said first resilient means by said second resilient means when said flexible sleeve contacts said spring assembly.

2. The flexible connector according to claim 1, wherein said first resilient means is a first expansible member and said second resilient means is a second expansible member.

3. The flexible connector according to claim 1, wherein said spring assembly is disposed concentrically with respect to said flexible sleeve.

4. The flexible connector according to claim 1, wherein said flexible sleeve is an elastomeric sleeve.

5. The flexible connector according to claim 1, wherein the force is tensile load.

6. The flexible connector according to claim 1, wherein the force is a moment.

7. The flexible connector according to claim 1, wherein the force is a combination of a tensile load and a moment.

8. A flexible connector for resiliently securing at least two objects together, the flexible connector comprising:

first means for connecting the at least two objects, wherein said first means includes a flexible sleeve having a first cross section, and said first cross section undergoes a reduction at a first reduction rate upon application of a force;

second means for connecting the at least two objects, wherein said second means includes a spring assembly having a second cross section, and said second cross section undergoes a reduction at a second reduction rate upon application of the force;

first anchoring means for securing the flexible connector to one of the at least two objects, said first and second means being secured to said first anchoring means; and second anchoring means for securing the flexible connector to one of the at least two objects, said first and second means being secured to said second anchoring means;

wherein at least one of said first and second means undergoes partial elastic elongation upon application of the force, said first and second reduction rates differ, each of said first and second means contributes opposing forces to the force until said flexible sleeve contacts said spring assembly, whereupon said first and second means are capable of withstanding additional forces at a substantially reduced elongation rate;

wherein said second means is inhibited from elongating greater than its elastic limit by the forces exerted on said second means by said first means when said first means contacts said second means.

9. The flexible connector according to claim 8, wherein said second means is disposed concentrically with respect to said first means.

10. The flexible connector according to claim 8, wherein said flexible sleeve is an elastomeric sleeve.

11. The flexible connector according to claim 8, wherein the force is tensile load.

12. The flexible connector according to claim 8, wherein the force is a moment.

13. The flexible connector according to claim 8, wherein the force is a combination of a tensile load and a moment.

* * * * *